United States Patent
Feldtkeller

(10) Patent No.: US 7,031,173 B2
(45) Date of Patent: Apr. 18, 2006

(54) METHOD FOR DRIVING A SWITCH IN A POWER FACTOR CORRECTION CIRCUIT AND DRIVE CIRCUIT

(75) Inventor: Martin Feldtkeller, München (DE)

(73) Assignee: Infineon Technologies AG, Müchen (DE)

(*) Notice: Subject to any disclaimer, the term of this patent is extended or adjusted under 35 U.S.C. 154(b) by 0 days.

(21) Appl. No.: 10/998,191

(22) Filed: Nov. 24, 2004

(65) Prior Publication Data
US 2005/0146908 A1   Jul. 7, 2005

(30) Foreign Application Priority Data
Nov. 28, 2003  (DE) ............................ 103 55 670

(51) Int. Cl.
*G05F 1/70*   (2006.01)
(52) U.S. Cl. ............................ 363/89; 323/222
(58) Field of Classification Search ................ 363/44, 363/45, 81, 82, 89, 90, 125, 126; 323/207, 323/222, 282, 287, 288
See application file for complete search history.

(56) References Cited

U.S. PATENT DOCUMENTS

| 4,683,529 A | * | 7/1987 | Bucher, II | 363/44 |
| 5,146,398 A | | 9/1992 | Vila-Masot et al. | |
| 5,734,562 A | * | 3/1998 | Redl | 363/16 |
| 5,748,461 A | | 5/1998 | Preller | |
| 5,818,707 A | * | 10/1998 | Seong et al. | 363/89 |
| 5,841,268 A | * | 11/1998 | Mednik | 323/222 |
| 6,069,470 A | | 5/2000 | Feldtkeller | |
| 6,229,716 B1 | | 5/2001 | Preller | |
| 6,545,881 B1 | | 4/2003 | Preller | |
| 2002/0105815 A1 | | 8/2002 | Preller | |

FOREIGN PATENT DOCUMENTS

| DE | 44 37 459 C1 | 11/1995 |
| DE | 197 32 169 A1 | 4/1999 |
| DE | 199 39 389 A1 | 3/2001 |
| DE | 100 40 411 A1 | 3/2002 |
| EP | 0 886 200 A2 | 12/1998 |
| WO | WO 01/82459 A1 | 11/2001 |

* cited by examiner

*Primary Examiner*—Adolf Berhane
(74) *Attorney, Agent, or Firm*—Maginot, Moore & Beck

(57) ABSTRACT

A method for driving a switch in a power factor correction circuit comprises the step of generating a switch-on level of a drive signal of the switch for a switch-on duration dependent on a control signal, and the step of generating a switch-off level of the drive signal after the switch-on time has elapsed. The method further comprises the step of detecting a predetermined storage state of an inductive energy storage element after the switch-on duration has elapsed. In addition, the method comprises waiting until the end of a waiting duration, which is at least approximately proportional to the time duration between the beginning of the switch-on level and the detection of the predetermined storage state, before a renewed generation of a switch-on level, the waiting duration being dependent on the control signal.

A drive circuit is also disclosed for providing a drive signal according to the method.

21 Claims, 8 Drawing Sheets

METHOD FOR DRIVING A SWITCH IN A POWER FACTOR CORRECTION CIRCUIT AND DRIVE CIRCUIT

BACKGROUND

Method for driving a switch in a power factor correction circuit and drive circuit.

The present invention relates to a method for driving a switch controlling the current consumption of an inductive energy storage element in a switching converter that is used as a power factor correction circuit (Power Factor Controller, PFC) and is formed in particular as a step-up converter.

Such a switching converter used as a PFC is sufficiently known and described for example in DE 100 40 411 A1.

In order to afford a better understanding of the problem on which the invention is based, the fundamental construction of such a switching converter is explained below with reference to FIG. 1.

A switching converter used as a PFC has the task of making available a DC voltage Uout for a load from an AC voltage Un, the average current consumption of the PFC, starting from a predetermined power consumption, being intended to be at least approximately proportional to the profile of the input voltage Un in order principally to take up active power.

The switching converter illustrated in FIG. 1 comprises input terminals for applying an input voltage Un, for example a sinusoidal power supply voltage, and a rectifier GL that is connected downstream of the input terminals and provides a rectified voltage Uin from the input voltage Un. Connected in parallel with output terminals of the rectifier is a series circuit comprising an inductive energy storage element L1, for example a storage inductor, and a switch SW, formed for example as a power transistor. Connected in parallel with the switch SW, or in series with the inductive energy storage element L1 with the switch SW open, is a second rectifier arrangement, which, in the example, has a diode D and a capacitor C and also output terminals AK1, AK2 for providing the output voltage Uout.

In the case of this switching converter formed as a step-up converter, the inductive energy storage element L1 takes up energy with the switch closed and outputs said energy to the output capacitor C or the output terminals AK1, AK2 when the switch is subsequently open.

In order to achieve an average current consumption Iin that is approximately proportional to the input voltage Uin, it is known to switch on the switch SW in successive drive cycles for identical switch-on durations ton in each case and then to switch on the switch again after opening, as soon as the inductive energy storage element L1 is free of energy or demagnetized. The temporal profile of the input current Iin, which corresponds qualitatively to the temporal profile of the magnetization B of the energy storage element, is illustrated in FIG. 2a for this mode of operation. FIG. 2b shows the associated temporal profile of the drive signal S20 of the switch SW, which is generated from a control signal S10 and a magnetization signal S21 by a drive circuit 20. The magnetization signal S21 is provided for example by an auxiliary winding coupled inductively to the storage inductor L1. The control signal S10 determining the power consumption is generated from the output voltage Uout by a controller 10.

In the case of the drive method illustrated with reference to FIG. 2, the following holds true for an average current consumption Im per drive cycle of the duration T:

$$Im = \hat{I}in/2 \qquad (1)$$

where $\hat{I}in$ represents the peak value of the input current Iin per drive cycle. Assuming that the inductor L1 is not operated in the saturation region, the following holds true:

$$\hat{I}in = (Uin/L1) \cdot ton \qquad (2)$$

where Uin in (2) denotes the instantaneous value of the rectified input voltage Uin and L1 denotes the inductance value of the storage inductor. Taking account of (1) and assuming that the control signal S10— and thus the switch-on duration ton—and also the input voltage Uin change slowly in comparison with the duration of a drive cycle, the average current consumption Im per drive cycle is proportional to the instantaneous value of the input voltage Uin. The average current consumption Im thus likewise has a periodic profile in accordance with the input voltage Uin. The same holds true for the instantaneous power consumption of the switching converter.

Assuming that the input voltage Uin changes very slowly in comparison with the duration of a drive cycle, so that the input voltage Uin may be assumed to be constant at least for a number of successive drive cycles, the following holds true for the power consumption during a drive cycle:

$$Pin = Uin \cdot Im = (Uin^2/L1) \cdot ton \qquad (3)$$

The switch-off duration toff, which corresponds to the demagnetization duration, is proportional to the switch-on duration ton, where the following holds true:

$$toff = ton \cdot Uin/(Uout - Uin) \qquad (4)$$

Thus, the duration T=ton+toff of a drive cycle is proportional to the switch-on duration ton, and the instantaneous power consumption is thus inversely proportional to the switching frequency f=1/T, said switching frequency varying when considered over a period of the input voltage Uin.

If the switch-on duration ton decreases in order, when considered over a period of the input voltage Uin, to achieve a decreasing average power consumption, then the switching frequency rises overall. In the case of low power consumptions, very high switching frequencies may occur as a result, which is undesirable owing to the switching losses which rise as a result.

A similar problem of a rising switching frequency as the power consumption decreases arises in the case of DC voltage switching converters operated in free-running fashion, so-called DC—DC converters. One possibility for limiting an excessively great rise in the switching frequency in the case of a low power consumption is described for such DC-DC converters in DE 44 37 459 C1, DE 197 32 169 A1 or DE 199 39 389 A1. In this case, after a magnetization of a primary coil of a transformer by application of an input voltage and a subsequent demagnetization of the primary coil, one or a plurality of so-called free transformer oscillations are permitted before the primary coil is remagnetized.

In the case of the step-up converters used as a PFC, such an oscillation after a demagnetization of the storage inductor has a very high frequency and decays rapidly, so that said oscillation cannot be detected accurately enough. Moreover, a waiting time dependent on the frequency of said oscillation would have the effect that the required proportionality between input voltage and current consumption would no longer be reliably ensured.

DE 100 40 411 A1 discloses a switching converter which is used as a PFC and in which the switching frequency of a switch controlling the current consumption of a storage inductor is provided by means of a voltage controlled oscillator in a manner dependent on a difference between the output voltage and the instantaneous value of the rectified input voltage. In the case of this method, the switching frequency follows the profile of the input voltage, which is also the case with a PFC operated in free-running fashion, but, in contrast to a PFC operated in free-running fashion, is not dependent on the power consumption. In the case of this method, pauses which are proportional to the switch-on duration plus the demagnetization duration are established between the demagnetization of a storage inductor and the switching on again of a switch connected in series with the storage inductor. What is disadvantageous about this method is that, in order to provide a signal that prescribes the switch-on instants, the instantaneous value of the input voltage and the output voltage has to be detected as exactly as possible by means of resistor dividers, which is complicated and thus cost-intensive. Moreover, in the case of this method as well, very short switch-on durations may occur in the case of a low power consumption.

A method for driving a PFC in trapezoidal current operation, which does not involve waiting for a demagnetization of the storage inductor before a process of switching on again, is described in U.S. Pat. No. 5,146,398.

It is an aim of the present invention to make available a method for driving a switch controlling the current consumption of an inductive energy storage element in a switching converter, in particular in a switching converter used as a PFC, which limits a rise in the switching frequency as the power consumption decreases, and which can furthermore be realized simply and cost-effectively. It is additionally an aim of the invention to make available a drive circuit that realizes such a method for a switch in a switching converter.

SUMMARY

The method according to the invention relates to the provision of a drive signal for a switch controlling the current consumption of an inductive energy storage element in a switching converter which provides an output voltage from an input voltage, which has a rectifier arrangement—coupled to the inductive energy storage element—with output terminals for providing the output voltage and in which a control signal controlling the power consumption is available. The method in each case comprises the following method steps for a drive cycle of the switch:

generation of a switch-on level of the drive signal for closing the switch for a switch-on duration dependent on the control signal, and of a switch-off level of the drive signal for opening the switch after the switch-on time has elapsed, detection of a predetermined storage state of the inductive energy storage element after the switch-on duration has elapsed, waiting until the end of a waiting duration, which is at least approximately proportional to the time duration between the beginning of the switch-on level and the detection of the predetermined storage state, before a renewed generation of a switch-on level, the waiting duration being dependent on the control signal.

The inductive energy storage element is for example a storage inductor and the detected storage state corresponds for example to the state in which said inductor is completely free of energy, that is to say demagnetized, for the first time after the switch-on time has elapsed. This is taken as a basis for the explanation hereinafter, without restricting the invention thereto. The time duration that passes between the end of the switch-on duration and the first complete demagnetization is referred to as the demagnetization duration in this case.

The switch-on duration is preferably exponentially dependent on the control signal. This makes it possible to achieve an identical control behavior with regard to the power consumption for different root-mean-square values of the input voltage, which is explained for example in EP 0 886 200 B2.

By virtue of the proportionality between the waiting time and the sum of switch-on duration and demagnetization duration, this method ensures the proportionality—required for a power factor controller (PFC)—between the input voltage and the average current consumption per drive cycle. By selecting this proportionality factor depending on the control signal, it is possible in particular here, in the case of a low power consumption, or in the case of a control signal indicating a low power consumption, to choose the waiting durations to be long in comparison with the sum of switch-on duration and demagnetization duration. As a result, the switching frequency decreases and the switch-on duration per switch-on process has to be increased in order to achieve a required power consumption. Very short switch-on durations, which are thus severely beset by power losses, can thereby be avoided.

The proportionality factor between the waiting duration and the time duration between the beginning of the switch-on level and the detection of the predetermined storage state, that is to say the sum of switch-on duration and demagnetization duration, is preferably constant for a predetermined value range of the control signal. For this purpose, a possible value range of the control signal is preferably subdivided into at least two partial value ranges which are in each case assigned different proportionality factors.

A hysteresis is preferably taken into account in the event of transition from one proportionality factor to another proportionality factor between two of the partial value ranges of the control signal in order to avoid continual alternation between two proportionality factors in the event of small fluctuations in the control signal about a value lying in such a transition range.

However, it is also possible to adapt the proportionality factor continuously to the control signal, for example by choosing the proportionality factor linearly dependent on the control signal.

In one embodiment of the invention, it is provided that a waiting duration between a detection of the predetermined storage state and a renewed generation of the switch-on level is inserted only when the control signal has reached a predetermined first threshold that indicates that the power consumption has fallen below a predetermined first value. For power consumptions above said predetermined first value, the switch is driven for example by the known method explained in the introduction, in the case of which the switch respectively remains closed for a switch-on duration dependent on the control signal and is closed anew after the opening of the switch when the storage inductor connected in series with the switch is completely demagnetized for the first time.

When the switching converter is operated at the other end of the power scale, that is to say in the case of small power consumptions lying below a predetermined second value, one embodiment of the method provides for the switch-on duration to be kept constant independently of the control signal and for the power consumption to be controlled by means of the waiting time proportional to the sum of switch-on duration and demagnetization duration.

The method according to the invention for providing a drive signal for the switch in the switching converter can be realized completely as a digital method. The switch-on durations dependent on the control signal and the proportionality factors likewise dependent on the control signal may in this case be made available by digital calculation units or look-up tables. In this case, a clock generator serves as time reference element for the switch-on duration and for the determination of the sum of switch-on duration and demagnetization duration.

The method according to the invention may also be realized by analog circuit means or in hybrid technology with digital and analog circuit means. Thus, one embodiment of the method provides for evaluating a charge state of a capacitive storage element in order to provide a drive signal having waiting durations. In the case of this method, a switch-on level of the drive signal is generated and the capacitive storage element is charged with a charging current dependent on the control signal if a voltage across the storage element reaches a predetermined first reference value. A switch-off level of the drive signal is generated if the voltage across the storage element reaches a predetermined second reference value, the capacitive storage element being charged further after said second reference value has been reached. Discharging of the storage element with a discharging current dependent on the control signal begins if the predetermined magnetization state of the inductive energy storage element is detected. In the case of this method, the switch-on level is generated anew if the voltage across the capacitive storage element has again fallen to the first reference value.

The first and second reference values are preferably fixedly predetermined in the case of this method.

In the case of this method, the time duration for which the capacitive storage element is charged corresponds to the sum of switch-on duration of the switch and demagnetization duration of the storage inductor. The waiting time corresponds to the discharge duration of the capacitive storage element. In this case, the proportionality factor between the waiting duration and the sum of switch-on duration plus demagnetization duration corresponds to the ratio between the discharging current and the charging current, which are in each case dependent on the control signal.

A drive circuit that realizes such a method for generating a drive signal for a switch controlling the current consumption of an inductive energy storage element in a switching converter comprises a first input for feeding in a control signal controlling a power consumption, and a second input for feeding in a first storage state signal indicating a storage state of the inductive energy storage element, and also an output for providing the drive signal. The drive circuit additionally comprises a capacitive energy storage element, a charging circuit connected to the capacitive energy storage element, which charging circuit provides a charging current dependent on the control signal, and a discharging circuit connected to the capacitive energy storage element, which discharging circuit provides a discharging current dependent on the control signal. In this case, a first comparator arrangement is connected to the energy storage element, which comparator arrangement compares a voltage across the energy storage element with a first reference value, and a second comparator arrangement is connected to the energy storage element, which comparator arrangement compares the voltage across the energy storage element with a second reference value. The drive circuit additionally comprises a signal generating circuit, which generates the switch-on level of the drive signal depending on an output signal of the first comparator arrangement and generates the switch-off level of the drive signal depending on an output signal of the second comparator arrangement.

BRIEF DESCRIPTION OF THE DRAWINGS

The present invention is explained in more detail below in exemplary embodiments with reference to figures.

In the figures, unless specified otherwise, identical reference symbols designate identical parts and signals with the same meaning.

DESCRIPTION

Figure 1:
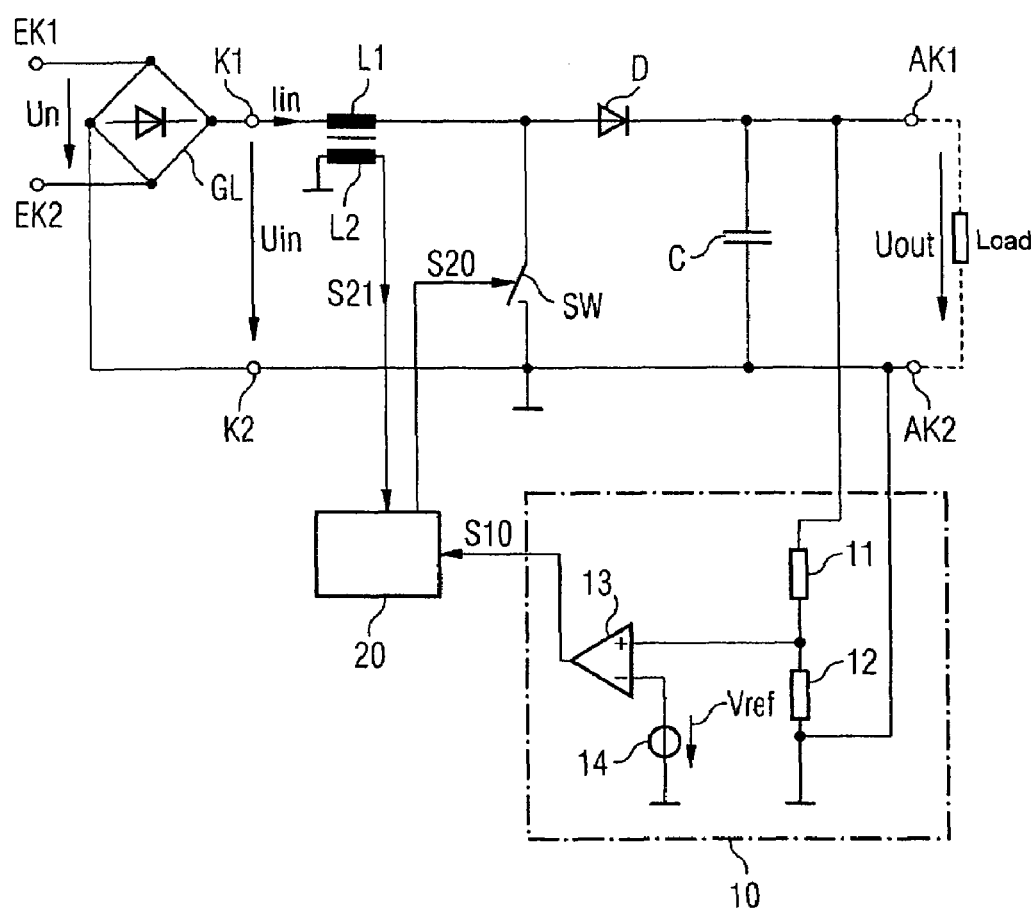
FIG. 1 shows a switching converter which is formed as a step-up converter, is used as a power factor controller (PFC) and has a storage inductor and also a switch controlling the current consumption of the storage inductor, and a rectifier arrangement.

The following explanation of the drive method according to the invention for a switch SW that controls the current consumption of an inductive energy storage element, in particular of a storage inductor, in a switching converter is based on the switching converter formed as a step-up converter that is illustrated in FIG. 1. Said switching converter has circuit nodes K1, K2 between which a rectified AC voltage Uin is present, which is converted into an output voltage Uout at output terminals AK1, AK2 by means of a converter unit.

The converter unit comprises an inductive energy storage element that is formed as a storage inductor L1 and is connected in series with the switch SW between the circuit nodes K1, K2. Connected in parallel with the switch SW, or in series with the storage inductor S1 with a switch SW open, is a rectifier arrangement having a diode D and a capacitor C, it being possible to tap off the output voltage Uout across the capacitor C. A drive unit 20 is provided for driving the switch SW, which drive unit generates a drive signal S20 depending on a control signal S10 and a signal S21 indicating a magnetization state of the storage inductor L1. In this case, the magnetization state signal S21 is generated by an auxiliary winding L2 that is inductively coupled to the storage inductor L1.

The control signal S10, which determines the power consumption of the switching converter, is provided by a controller 10 depending on the output voltage Uout in a sufficiently known manner, by a signal dependent on the output voltage Uout being compared with a reference value Vref, a resultant difference signal being fed to a control amplifier that provides the control signal S10. Said control amplifier has for example an integral action (I controller) or a proportional-integral action (PI controller). In this case, the control time constant of the control amplifier is chosen to be so large that the periodic profile of the input voltage Uin and thus the periodic profile of the power consumption which has already been explained effects no or only an insignificant ripple of the control signal S10.

Figure 3A:
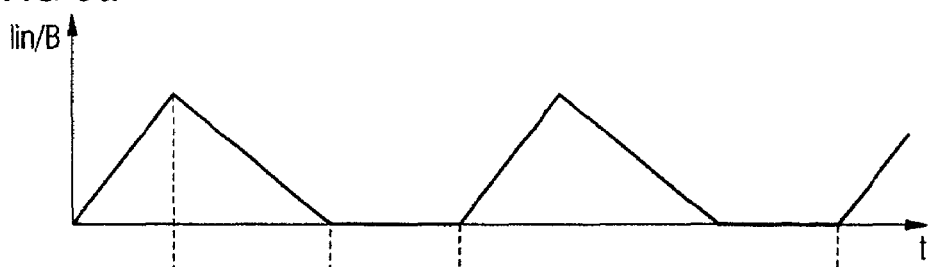
FIG. 3 shows the temporal profile of the current through the storage inductor and of the drive signal of the switch in the case of the drive method according to the invention.

FIG. 3 shows the temporal profile of the drive signal S20 for the switch SW and the resultant temporal profile of the current Iin flowing through the storage inductor L1 or the temporal profile of the magnetization B of the storage inductor L1, the latter temporal profile corresponding qualitatively to said current profile.

Figure 3B:
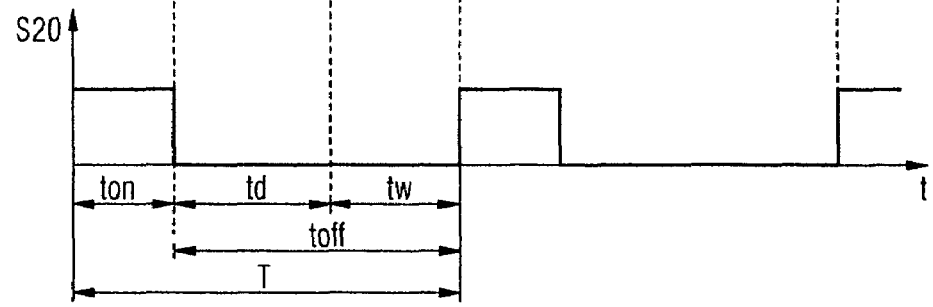

Referring to FIG. 3b, the switch SW is driven cyclically by the drive signal S20 in the case of the method according to the invention, for each drive cycle provision being made for generation of a switch-on level of the drive signal S20 for a switch-on duration ton, said switch-on level corresponding to a high level of said drive signal S20 in the example in accordance with FIG. 3b, in order to switch on the switch SW. During said switch-on duration ton, the input current Iin rises linearly, the gradient of this current profile, in the manner already explained, being proportional to the quotient of the instantaneous value of the input voltage Uin and the inductance value of the storage inductor L1. After the switch-on duration ton has elapsed, the drive signal S20 assumes a switch-off level, which corresponds to a low level of the drive signal S20 in the example illustrated, in order to switch off the switch SW. During a time duration referred to below as the demagnetization duration td, the storage inductor L1 outputs the energy stored during the switch-on duration ton via the diode D to the output capacitor C or the output terminals AK1, AK2, the current Iin decreasing linearly during this time duration. In this case, the following holds true for the gradient dIin/dt of the current edge during the demagnetization duration td:

the drive circuit.

$$d\mathrm{In}/dt = (U\mathrm{out} - U\mathrm{in})/Li \qquad (5)$$

The end of this demagnetization duration td is characterized by the fact that the storage inductor L1 is completely free of energy or demagnetized. According to the invention, said demagnetization duration td is followed by a waiting time tw before the renewed generation of a switch-on level, said waiting time tw being proportional to the sum of the switch-on time ton and the demagnetization duration td, that is to say the following holds true:

$$tw = p \cdot (ton + td) = p \cdot ts \qquad (6),$$

where ts=ton+td hereinafter designates a storage duration, that is to say the duration for which energy is stored in the storage inductor L1. The proportionality factor p between the storage duration ts and the waiting duration tw is a function of the control signal, that is to say the following holds true:

$$p = f(S10) \qquad (7).$$

The required proportionality between the current consumption referred to a drive cycle and the instantaneous value of the input voltage Uin holds true when driving the switch SW in accordance with the method according to the invention, it being assumed that the duration of a drive cycle, which is designated by T in FIG. 3b, is significantly shorter than the period duration of the input voltage Uin.

In the case of the method according to the invention, the following holds true for the average value of the input current Iin taken up during the duration T of a drive cycle:

$$Im = \hat{I}/[2 \cdot (1+p)] \qquad (8).$$

For the peak value $\hat{I}$, the relationship (2) already explained in the introduction holds true here, too, so that, after insertion of (2) in (8), the following holds true for the average current Im taken up per drive cycle:

$$Im = (U\mathrm{in} \cdot ton)/[2 \cdot L1 \cdot (1+p)] \qquad (9).$$

Assuming an input voltage Uin that changes slowly in comparison with the duration T of a drive cycle and assuming a control signal S10 that changes slowly in comparison with the duration of a drive cycle T, and a proportionality factor p that thus changes slowly, it therefore also holds true in the method according to the invention that the average current Im taken up per drive cycle is proportional to the instantaneous value of the input voltage Uin.

Figure 4:
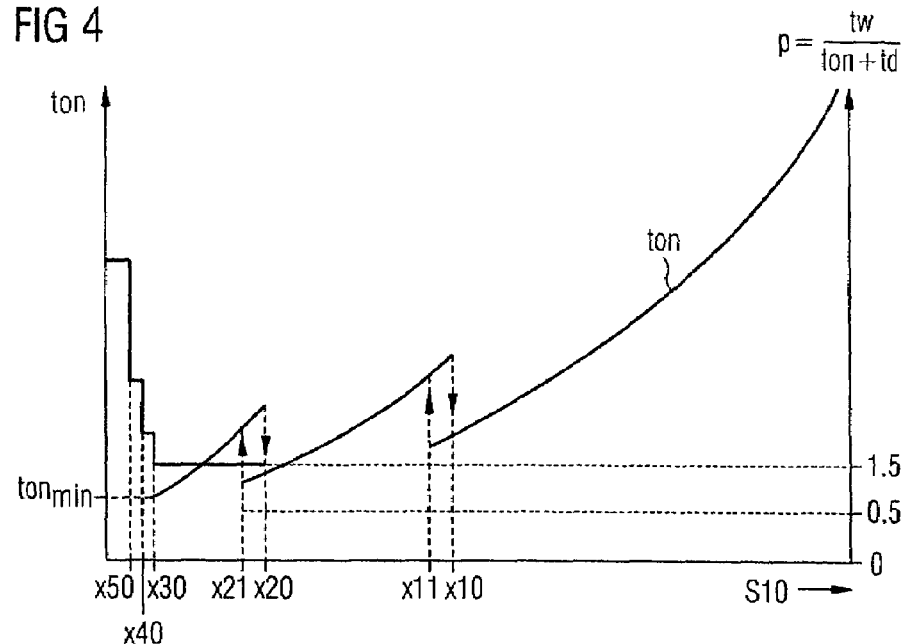
FIG. 4 illustrates the switch-on duration of the switch and also the proportionality factor between waiting duration and the sum of switch-on duration and demagnetization duration depending on a control signal determining the power consumption.

Owing to the dependence of the demagnetization duration td on the input voltage Uin as already explained in the introduction, which also holds true in the case of the method according to the invention, the duration of a drive cycle T or the switching frequency f=1/T of the switch SW varies with the instantaneous value of the input voltage Uin, it being possible in the case of the method according to the invention, by virtue of the waiting duration tw, to counteract a rise in the switching frequency in the case of a low power consumption of the switching converter, as is explained below with reference to FIG. 4.

FIG. 4 shows a diagram of the profile of the switch-on duration ton as a function of the control signal S10 and the dependence of the proportionality factor p on the control signal S10. In the exemplary embodiment illustrated in FIG. 4, the switch-on duration ton of the switch SW is exponentially dependent on the control signal S10, that is to say the following holds true:

$$ton = a1 \cdot e^{b1 \cdot S10} \qquad (10),$$

where a1, b1 are constants chosen in a manner dependent on the circuit.

Figure 2A:
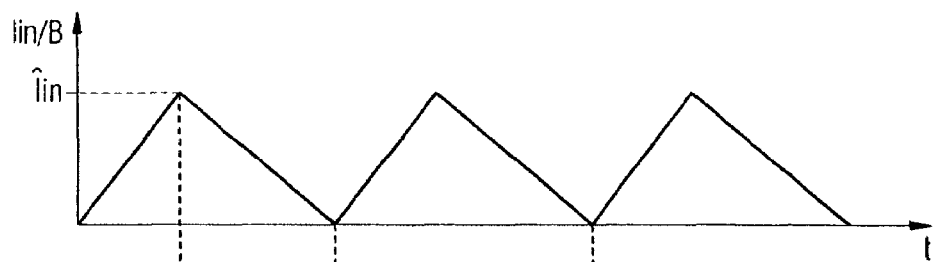
FIG. 2 shows the profile of a current through the storage inductor and of a drive signal of the switch in the case of a known drive method according to the prior art.
Figure 2B:
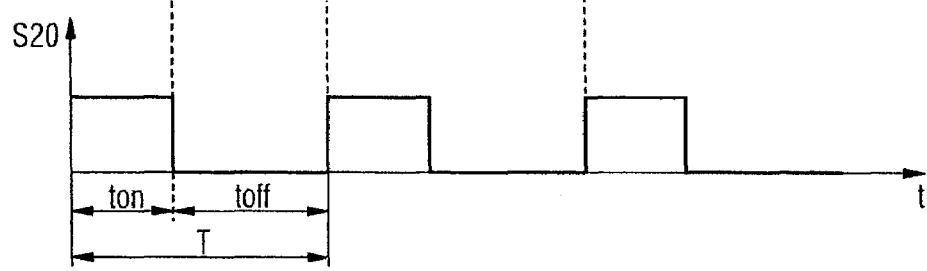

It is assumed for the following consideration that the control signal S10 is generated such that the power consumption of the switching converter increases as the control signal S10 rises. Firstly, the profile of the switch-on duration ton is considered for control signal values greater than a limit value x11. For these control signal values S10, the switch is driven in such a way as to result in a continuous current operation of the storage inductor L1, which is also referred to as critical conduction mode (CCM). In this case, p=0 holds true for the proportionality factor, that is to say no waiting durations tw are inserted between the demagnetization of the storage inductor L1 and the renewed switch-on of the switch. In this case, the temporal profile of the drive signal S20 and of the input current Iin corresponds to the profile already explained with reference to FIG. 2.

If the control signal S10 falls below said limit value x11, which denotes a specific power consumption, then a waiting time tw is inserted between the demagnetization instant of the storage inductor L1 and the renewed switch-on of the switch SW, the ratio between waiting time tw and storage duration ts being 0.5 in the example. This intermittent current operation is referred to below as WCM operation (WCM=Wait Cycle Mode).

The proportionality factor is intended to be raised neutrally in respect of power, that is to say that a characteristic curve of the power consumption as a function of the control signal S10 is intended to have a continuous profile even in the transition range between values for S10 greater than x11 and values for S10 less than X11. In order to change this proportionality factor p neutrally in respect of power, the dependence of the switch-on duration ton on the control signal S10 is adapted correspondingly with a change in the proportionality factor. This adaptation is effected in the event of a transition from the operation without a waiting time to an operation with a waiting time, that is to say in the event of a transition from a value p=0 to a value p≈0, and vice versa. This adaptation is also effected in the case of operation with a waiting time if a change is made between individual proportionality factors.

Assuming that $p_v$ designates the proportionality factor before a change of the proportionality factor and $p_n$ designates said proportionality factor after a change, and assuming that ton=$f_v$(S10) designates the dependence of the switch-on duration before the change of the proportionality factor, the following holds true for this dependence $f_n$(S10), after the change of the proportionality factor:

$$f_n(S10)=(1+p_n)/(1+p_v) \cdot f_v(S10) \tag{11}$$

In the case illustrated in FIG. 4, the following thus holds true for the switch-on duration ton for control signal values S10 less than x11:

$$ton=1.5 \cdot a1 \cdot e^{b1 \cdot S10} \tag{12}$$

If the control signal S10 decreases further on account of a decreasing power consumption of a load connected to the output terminals AK1, AK2, then the proportionality factor rises to a proportionality factor p=1.5 starting from when a control signal value x21 is undershot, the dependence of the switch-on duration ton on the control signal S10 being correspondingly adapted in the manner explained above.

A hysteresis is preferably taken into account in the event of transition between two proportionality factors, said hysteresis being illustrated in FIG. 4. In the example, the proportionality factor rises from 0 to 0.5 if the control signal value S10 becomes less than the reference value x11. For rising control signal values, a change is made from the proportionality factor p=0.5 to the proportionality factor p=0 only in the case of a reference value x10 greater than the reference value x11. A corresponding hysteresis with reference values x21, x22 is taken into account in the event of the transition between the proportionality factors p=0.5 and p=1.5.

As can be seen in FIG. 4, the switch-on duration rises after a change to a larger proportionality factor or after insertion of a longer waiting time tw, in order to decrease as the control signal S10 decreases further.

The switch-on duration ton is preferably limited to a minimum value $ton_{min}$. In the case of the method illustrated in FIG. 4, this limitation commences if the control signal S10 decreases below a reference value x30. For control signal values S10 below this reference value, the switch-on duration $ton_{min}$ remains constant, the power consumption being controlled exclusively by means of the waiting time tw, which increases as the control signal S10 decreases further. In this case, the proportionality factor p rises further as the control signal S10 decreases further, this rise being effected stepwise in the example in accordance with FIG. 4, so that, in the case of a low power consumption, identical power consumptions are achieved in each case for specific value ranges of the control signal S10.

In addition to the stepwise profile—illustrated in FIG. 4—of the proportionality factor p as a function of the control signal S10, it is also possible to permit the proportionality factor to rise continuously as the control signal decreases. Ideally, the proportionality factor is chosen such that the switching frequency, in waiting time operation, is approximately constant over wide ranges of the control signal S10. This can be achieved by the proportionality factor having a profile that is inversely proportional to or the inverse to the switch-on duration. In the case of very small values for the control signal S10, the proportionality factor p in this case rises to a greater extent than inversely proportionally to the control signal S10, in order not to fall below a minimum switch-on duration, as a result of which the switching frequency then decreases.

The method according to the invention may be realized exclusively by digital switching means to which the control signal is fed and which generate a drive signal taking account of the control signal, said drive signal having switch-on pulses with switch-on durations and waiting durations dependent on the control signal, said waiting durations being related to switch-on duration plus demagnetization duration by way of the proportionality factor dependent on the control signal.

Figure 5:
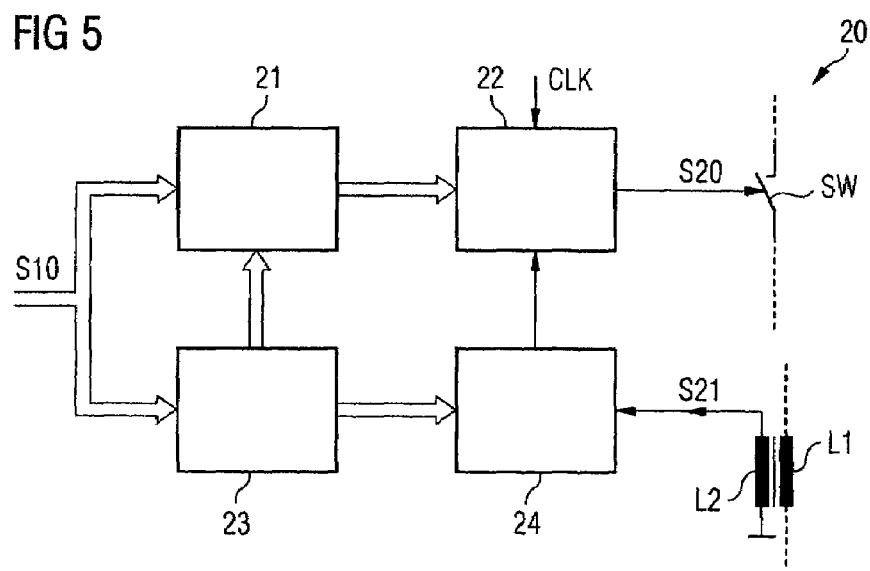
FIG. 5 illustrates an exemplary embodiment of a digitally realized drive circuit for providing the drive signal for the switch.

FIG. 5 shows a block diagram of a drive circuit that can be realized with digital means and generates a drive signal S20 for the switch SW in accordance with the method according to the invention. The drive circuit comprises an input for feeding in the control signal S10, which is fed to a look-up table 21 and a state logic unit 23. A pulse width generator 22 generates the drive signal S20 according to an output signal of the table 21 and an output signal of a waiting time generator 24. In this case, the waiting time generator 24 is fed the output signal S21 of the auxiliary winding L2 and an output signal of the state logic unit 23.

Stored in the look-up table 21 are values for the switch-on durations which are assigned to the individual values of the control signal S10, for example in accordance with the curve in FIG. 4. In order to achieve a hysteresis behavior for the transition between waiting time operation and non-waiting time operation and in order to achieve a hysteresis behavior in the event of a change in the proportionality factor within waiting time operation, the control signal values within such hysteresis ranges are in each case assigned two values for the switch-on duration.

The state logic unit 23 determines the respective operating state depending on the control signal S10, in which case, in addition to the basic operating states, WCM operation and CCM operation, a distinction is also made between operating states in which the control signal rises or decreases, in order to output to the pulse width generator, for the transition ranges exhibiting hysteresis, the respective correct switch-on duration value of the two switch-on duration values which are stored with respect to a control signal value in the table 21.

The state logic unit drives the waiting time generator 24, depending on the operating state, which, in the manner explained, also takes account of the hystereses, to generate a waiting time signal and to output it to the pulse width generator.

Figure 6:
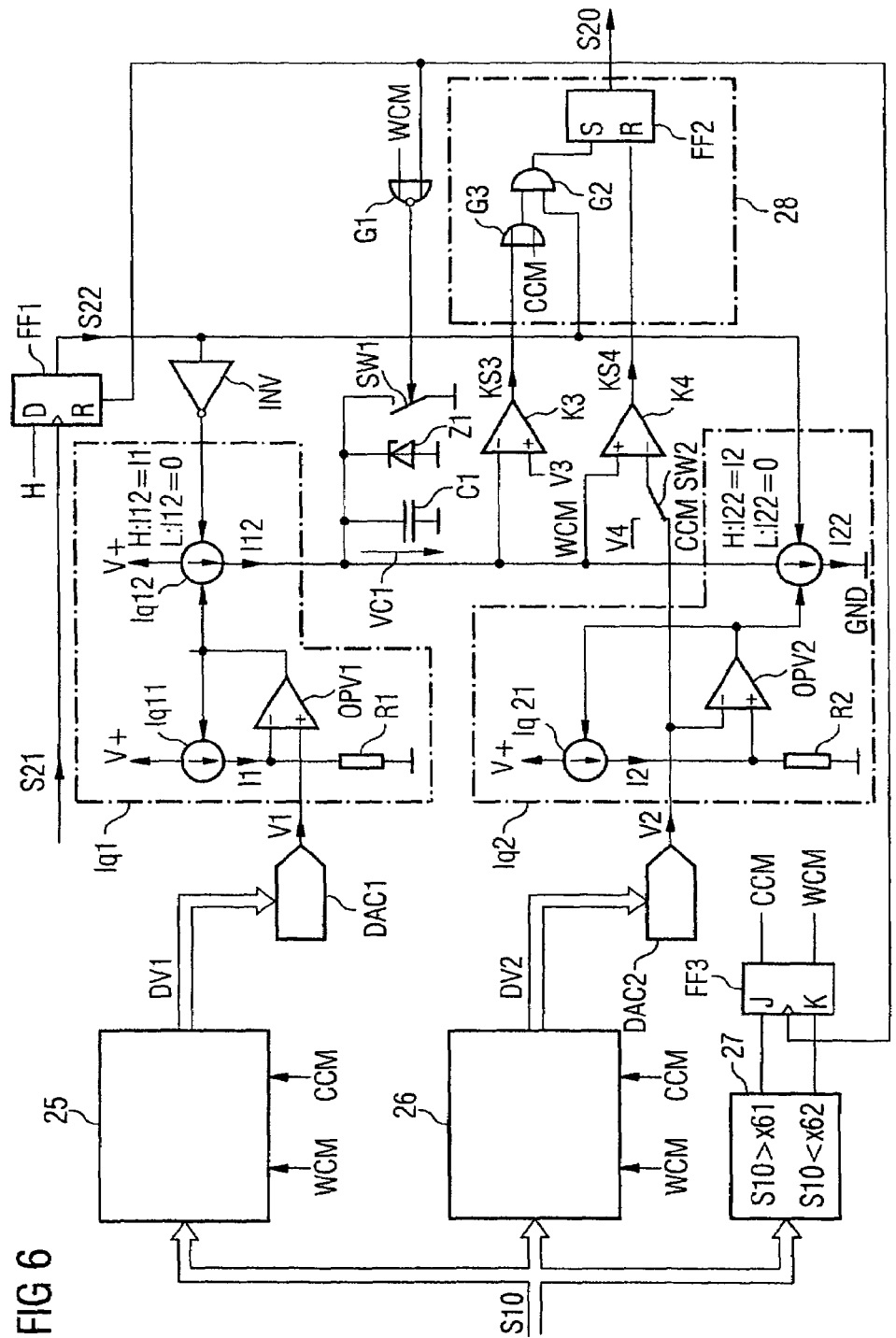
FIG. 6 shows a further exemplary embodiment of a drive circuit for providing a drive signal for the switch in the switching converter, which generates drive signals with "waiting durations" in a first operating state and drive signals without "waiting durations" in a second operating state.

FIG. 6 shows a further exemplary embodiment of a drive circuit 20 for providing a drive signal S20 for the switch SW connected in series with the storage inductor L1. The drive circuit comprises an input terminal for feeding in the control signal S10, an output terminal for providing the drive signal S20 and also a further input terminal for feeding in a first storage state signal S21, which specifies a storage state of the storage inductor L1 and from which a second storage state signal S22 is made available using a D-type flip-flop FF1 that is still to be explained.

The drive circuit 20 illustrated is designed to drive the switch SW such that, depending on the value of the control signal S10, the intermittent current operation of the storage inductor L1 that has been explained arises, or that a continuous current operation of the storage inductor L1 arises, in the case of which the switch SW is respectively then switched on again as soon as the storage inductor is free of energy or demagnetized for the first time.

The circuit arrangement illustrated is formed as a mixed circuit with digital and analog circuit components. The arrangement comprises a digital comparator 27, to which the control signal S10 is fed and which compares this digital control signal S10 with two threshold values x61, x62, the comparison result for the comparison with the first threshold value x61 being fed to the J input of a JK flip-flop FF3 and the comparison result for the comparison with the second threshold value x62 being fed to the K input of said JK flip-flop FF3. A first state signal CCM and a second state signal WCM, which are complementary to one another, are available at outputs of said JK flip-flop FF3. In this case, the first state signal CCM assumes a high level if the drive circuit 20 is intended to drive the switch in CCM operation, and the second state signal WCM correspondingly assumes a high level if the drive circuit S20 drives the switch in WCM operation. A hysteresis is provided in the event of changeover from WCM operation to CCM operation, and vice versa, the drive circuit undergoing transition from WCM operation to CCM operation if the control signal S10 rises above the value of the first threshold x61. The drive circuit 20 undergoes transition from CCM operation to WCM operation if the control signal S10, as control signal values decrease, decreases below the value of the second threshold x62, where x62<x61 holds true.

Figure 9:
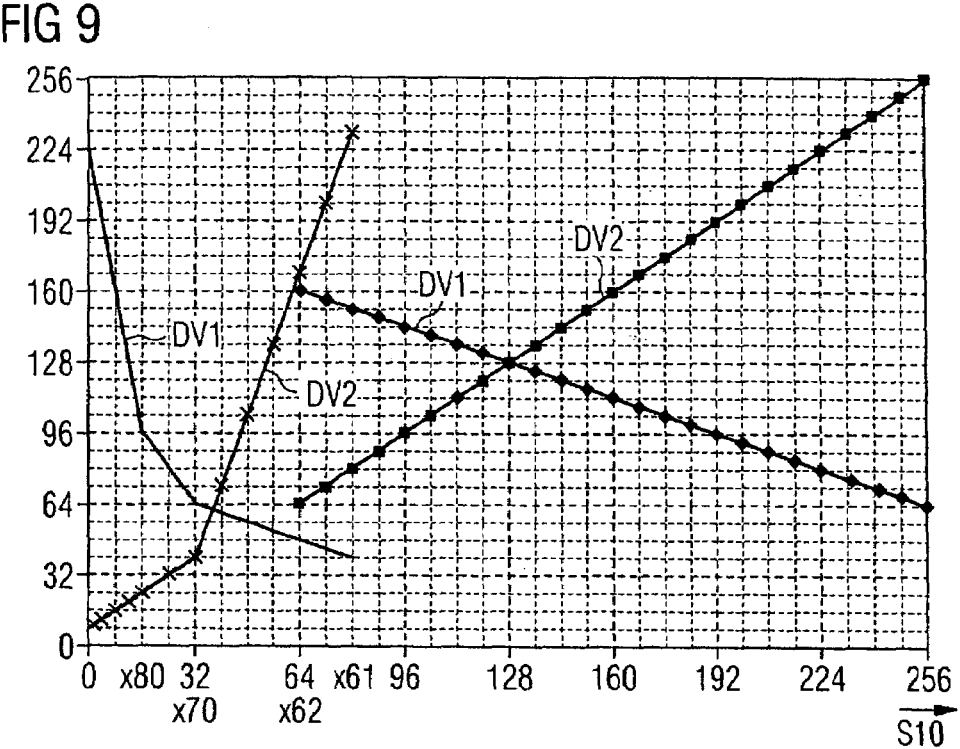
FIG. 9 shows the profile of a number of parameters occurring in the circuit according to FIG. 6 as a function of the control signal.

The circuit arrangement furthermore comprises two digital function generators 25, 26, which provide two digital control signals DV1, DV2 from the control signal S10 depending on the operating state prescribed by the state signals WCM, CCM. FIG. 9 shows by way of example the profile of these digital control signals DV1, DV2 as a function of the value of the control signal S10, FIG. 9 also depicting the thresholds x61, x62 at which a respective transition takes place from CCM operation to WCM operation, and vice versa.

The digital function generators 25, 26 are designed to make available, in CCM operation, control signals DV1, DV2 that are linearly dependent on the control signal S10. In the example illustrated, in which a digital control signal with values between 0 and 256 is present, the following holds true for the two control signals:

$$DV1 = c1 - S10 \quad (13)$$

$$DV2 = S10 \quad (14),$$

where c1 is a constant amounting to 192 for the curve illustrated in FIG. 9.

For WCM operation, the digital control signals DV1, DV2 in each case have linear profiles in sections, the following holding true for the first digital control signal DV1 in the example depending on the control signal S10:

$$DV1 = 224 - 8 \cdot S10 \text{ for } S10 = 0 \ldots x80 \quad (15a)$$

$$DV1 = 128 - 2 \cdot S10 \text{ for } S10 = x80 \ldots x70 \quad (15b)$$

$$DV1 = 80 - 0.5 \cdot S10 \text{ for } S10 \geq x70 \quad (15c).$$

In this case, x80=16 and x70=32 hold true in the exemplary embodiment in accordance with FIG. 9. The following holds true for the second control signal DV2 in WCM operation:

$$DV2 = S10 + 8 \text{ for } S10 = 0 \ldots x70 \quad (16a)$$

$$DV2 = 4 \cdot S10 - 88 \text{ for } S10 \geq x70 \quad (16b).$$

These relationships for DV1 and DV2 can be chosen depending on the application and desired control behavior.

The digital control signals DV1, DV2 are respectively fed to digital-to-analog converters DAC1, DAC2, which make available analog control signals V1, V2 from said digital control signals DV1, DV2.

In this case, the first analog control signal V1 is fed to a first controlled current source arrangement Iq1, which makes available a charging current I12 for a capacitor C1 connected to said first current source Iq1. The second analog control signal V2 is fed to a second current source arrangement Iq2, which provides a discharging current I22 for the capacitor C2 likewise connected to said second current source arrangement Iq2. The first and second current sources Iq1, Iq2 are connected in series between a positive supply potential V+ and reference-ground potential GND, the capacitor C1 being connected to a node common to the current source arrangements Iq1, Iq2 and is connected to reference-ground potential GND by one terminal. A zener diode Z1, which is connected in parallel with the capacitor C1 in this example, serves as overvoltage protection for the capacitor C1.

The current source arrangements Iq1, Iq2 respectively comprise a first current source Iq11, Iq21 and a second current source Iq12, Iq22, which are in each case driven jointly by an amplifier OPV1, OPV2. Furthermore, the second current sources Iq12, Iq22 can be switched on and off in a manner dependent on the second storage state signal S22, said second current sources supplying, in the switched-on state, a current corresponding to the current I1, I2 of the respective first current source Iq11, Iq21, as charging or discharging current. Thus, in the switched-on state, the charging current I12 made available by the second current source Iq12 of the first current source arrangement Iq1 is equal to the current I1 of the first current source Iq11 of the first current source arrangement Iq1. In the same way, the discharging current I22 made available by the second current source Iq22 of the second current source arrangement Iq2 corresponds to the current I2 provided by the first current source Iq21 of the second current source arrangement Iq2.

In this case, the first current sources Iq11, Iq21 are respectively part of a control arrangement with the amplifier OPV1, OPV2 and a resistor R1, R2, through which the respective output current I1, I2 of the first current sources Iq11, Iq21 flows, the amplifiers OPV1, OPV2 in each case driving the first current sources Iq11, Iq21 and thus also the second current sources Iq12, Iq22 such that said currents I1, I2 are proportional to the analog control signals V1, V2. For this purpose, the operational amplifiers OPV1, OPV2 in each case compare the voltage drop across a resistor R1, R2, through which the output current I1, I2 of the first current sources Iq11, Iq21 flows, with the respective analog control signal V1, V2.

The drive circuit 20 furthermore has a first and second comparator K3, K4, the first comparator K3 comparing a voltage Vc1 across the capacitor C1 with a first reference value V3 in order to make a first comparator signal KS3 available. The second comparator K4 compares said voltage Vc1 across the capacitor C1 with a second reference value V4 in WCM operation and with the second analog control signal V2 in CCM operation, in order to make a second comparator signal KS4 available. These two comparator signals are fed together with the second storage state signal S22 to a combination circuit 28, which provides the drive signal S20. This logic circuit 28 comprises an RS flip-flop, to whose reset input R the second comparator signal KS4 is fed. The set input S of said flip-flop FF2 is fed the output signal of an AND gate G2, which is fed the second storage state signal S22, on the one hand, and the output signal of an OR gate G3, on the other hand. The input of said OR gate G3 is fed the second comparator signal KS4 and the first state signal CCM, so that, when the drive circuit is operated in CCM operation, if the second state signal CCM assumes a high level, the first comparator signal KS3 is always present at the output of said OR gate G3.

Figure 7:
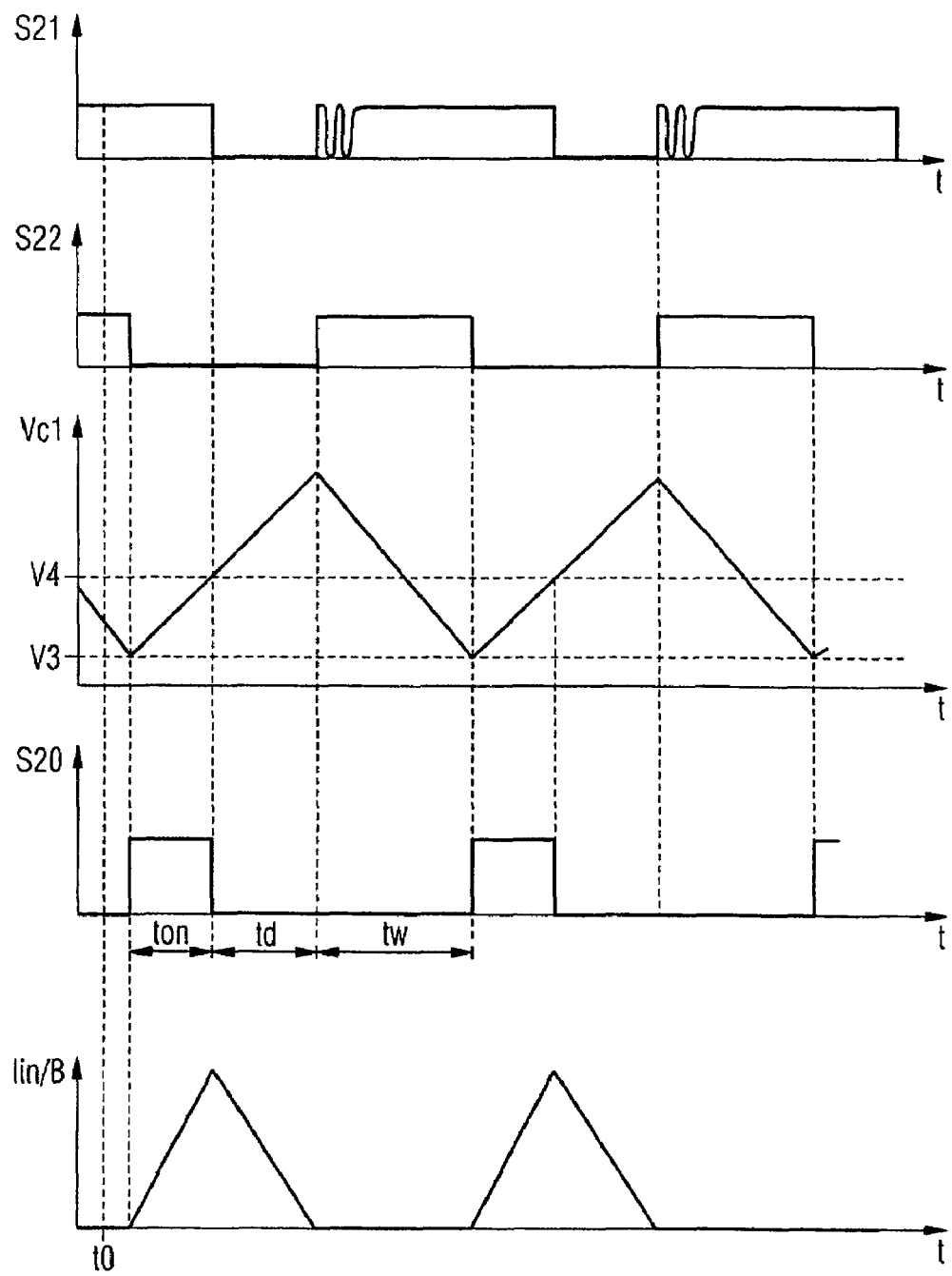
FIG. 7 shows the temporal profile of individual signals occurring in the drive circuit in accordance with FIG. 6 in the first operating state of the drive circuit.

The functioning of this drive circuit 20 is explained with reference to FIG. 7 first of all for WCM operation. FIG. 7 shows, illustrated one below the other, temporal profiles of the first storage state signal S21, of the voltage Vc1 across the capacitor C1, of the drive signal S20 and of the resultant profile of the current Iin flowing through the storage inductor L1, or of the magnetization B of said storage inductor L1.

Referring to FIG. 6, the second current source Iq12 of the first current source arrangement Iq1 is switched on and off by the inverted second storage state signal S22 via an inverter INV, while the second current source Iq22 of the second current source arrangement Iq2 is switched on and off by the storage state signal S22. In the case of a high level of the second storage state signal S22, the capacitor C1 is charged with the charging current I1 proportional to the analog control signal V1 or the digital control signal DV1, while in the case of a low level of said second storage state signal S22, the capacitor C1 is discharged with the discharging current I2 proportional to the second analog control signal V2 or the second digital control signal DV2.

The first storage state signal S21 made available by the auxiliary coil L2 coupled inductively to the storage inductor L1 in each case assumes a low level if the storage inductor L1 is demagnetized after the opening of the switch SW. If the switch SW is not immediately switched on again after a demagnetization of the storage inductor, then this signal effects transient oscillation to a high level after a rising edge, as is illustrated diagrammatically in FIG. 7. The second storage state signal S22 is made available from the first storage state signal S21 and the drive signal S20 by the D-type flip-flop FF1, the flip-flop FF1 being fed the first storage state signal S21 at its clock input and the drive signal S20 at its reset input. A high level is permanently present at the D input of the flip-flop. The second storage state signal S22 assumes a low level with a rising edge of the drive signal S20 and a high level with a rising edge of the first storage state signal S21.

In order to explain the method, the temporal profile of the signals illustrated in FIG. 7 starting from an instant t0 will now be considered. At said instant t0, the storage inductor L1 is demagnetized, the switch SW is open and the second storage state signal S22 has a high level. The capacitor C1 is thus discharged by the discharging current I2 until the capacitor voltage Vc1 has fallen to the first reference value V3. The flip-flop FF2 of the logic circuit 28 is thereupon set by means of the first comparator output signal KS3, the OR gate G3 and the AND gate G2 in order to generate a high level of the drive signal S20 and to switch on the switch SW. The second storage state signal S22 thereupon assumes a low level, and the capacitor C1 is charged with the charging current I1. If the capacitor voltage Vc1 in this case reaches the value of the second reference potential V4, the flip-flop FF2 of the logic circuit 28 is reset in order to generate a low level of the drive signal S20 and thereby to open the switch SW. The capacitor C1 is charged further with the charging current I1 until the next rising edge of the first storage state signal S21 occurs, that is to say until the storage inductor L1 is completely demagnetized. Starting from this instant, the second storage state signal S22 assumes a high level, as a result of which the capacitor C1 is discharged with the discharging current I2 until the capacitor voltage Vc1 has again fallen to the value of the first reference potential V3.

In the case of this method, the voltage across the capacitor Vc1 has a triangular profile, the voltage Vc1 rising proportionally to the charging current I1 during the sum of switch-on duration ton and demagnetization duration td and decreasing during the waiting time tw with a gradient proportional to the discharging current I2. In the case of this method, too, the sum of switch-on duration ton and demagnetization duration td is proportional to the waiting time tw, the following holding true:

$$tw/(ton+td)=I2/I1 \quad (17).$$

The proportionality factor p thus results from the ratio of discharging current I2 to charging current I1, these two currents being related to the control signal S10 in the manner explained above. In the case of this method, the proportionality factor p changes continuously with the control signal and increases as the control signal S10 decreases.

Figure 8:
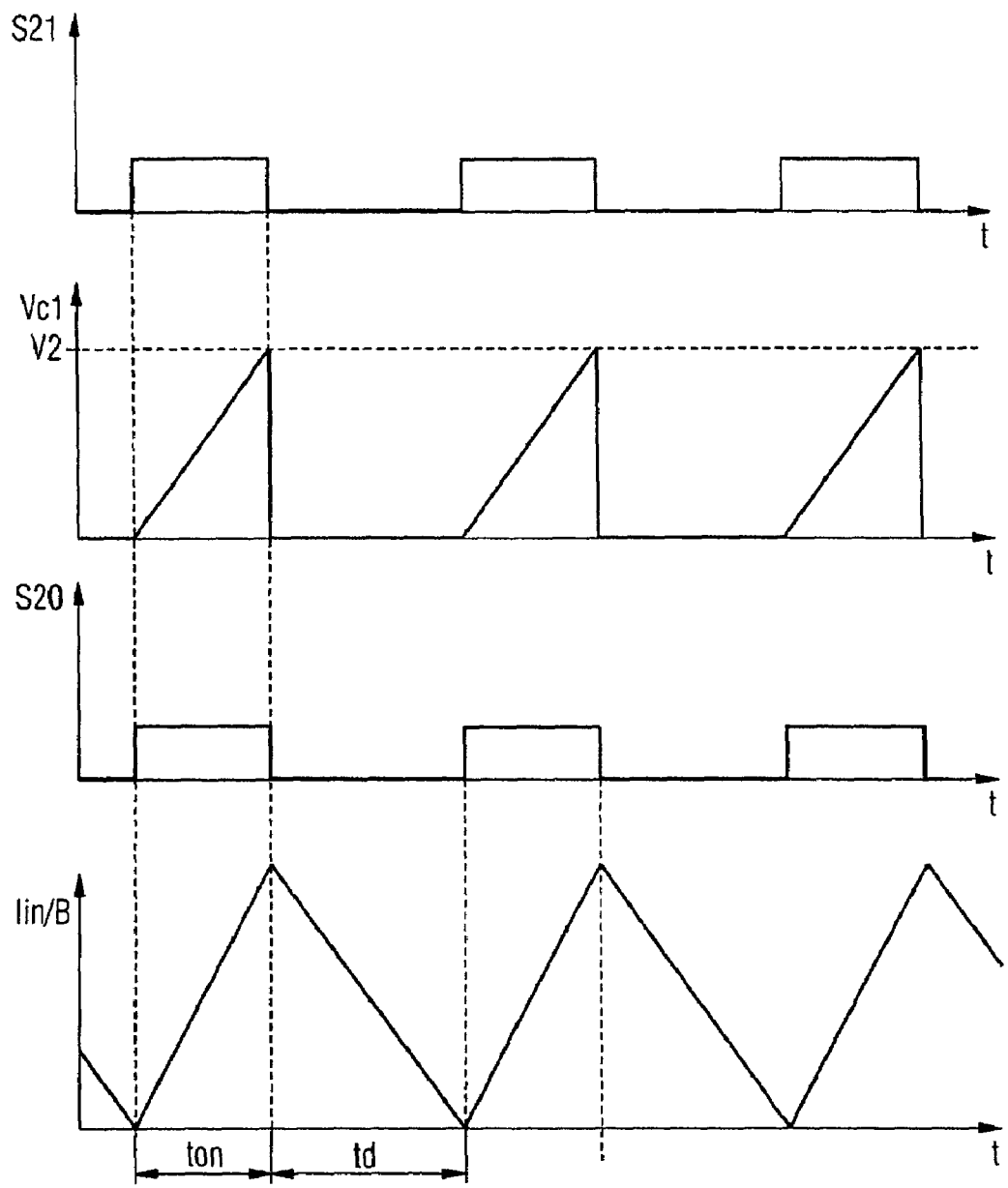
FIG. 8 shows the temporal profile of individual signals occurring in the drive circuit according to FIG. 6 for the second operating state of the drive circuit.

The functioning of the drive circuit during CCM operation is explained with reference to FIG. 8 on the basis of the temporal profiles of the first and second storage state signals S21, S22, of the capacitor voltage Vc1, of the drive signal S20 and of the current Iin of the storage inductor. During CCM operation, the first storage state signal S21 corresponds to the second storage state signal S22. With the switch closed, the capacitor voltage Vc1 rises with a gradient proportional to the charging current I1 until said voltage Vc1 reaches the value of the second analog control signal V2, the flip-flop FF2 then being reset and the switch SW being opened. By means of a switch SW1 connected in parallel with the capacitor C1 in drive circuit 20, the capacitor C1 is short-circuited in CCM operation in the event of a falling edge C1 of the drive signal 20, in order to rapidly discharge the capacitor, which results in a sawtooth-like profile of the capacitor voltage Vc1. The drive signal S20 then assumes a high level again in order to close the switch SW of the switching converter once again if the storage inductor L1 is completely demagnetized if the first or second storage state signal S21, S22 once again assumes a high level.

In the case of this explained method in CCM operation, by means of the charging current I1, the gradient of the capacitor voltage Vc1 with switch SW closed is dependent on the control signal S10. Furthermore, the switching threshold V2, which prescribes the switch-off of the switch SW, is likewise dependent on the control signal S10. The switch-on duration ton is proportional to the magnitude of the switching threshold and thus proportional to the signal DV2; it is inversely proportional to the charging current and thus inversely proportional to the signal DV1. The switch-on duration is thus proportional to the function S10/(c1–S10). If c1 is chosen to be 192, as in the example chosen, this function describes approximately an exponential profile in the value range of 64 to 255.

The accuracy of the approximation to an exponential profile could be additionally improved by means of a profile of the dependencies of DV1 and DV2 on the control signal S10 in CCM operation that is linear in sections and is not specifically illustrated.

Figure 11:
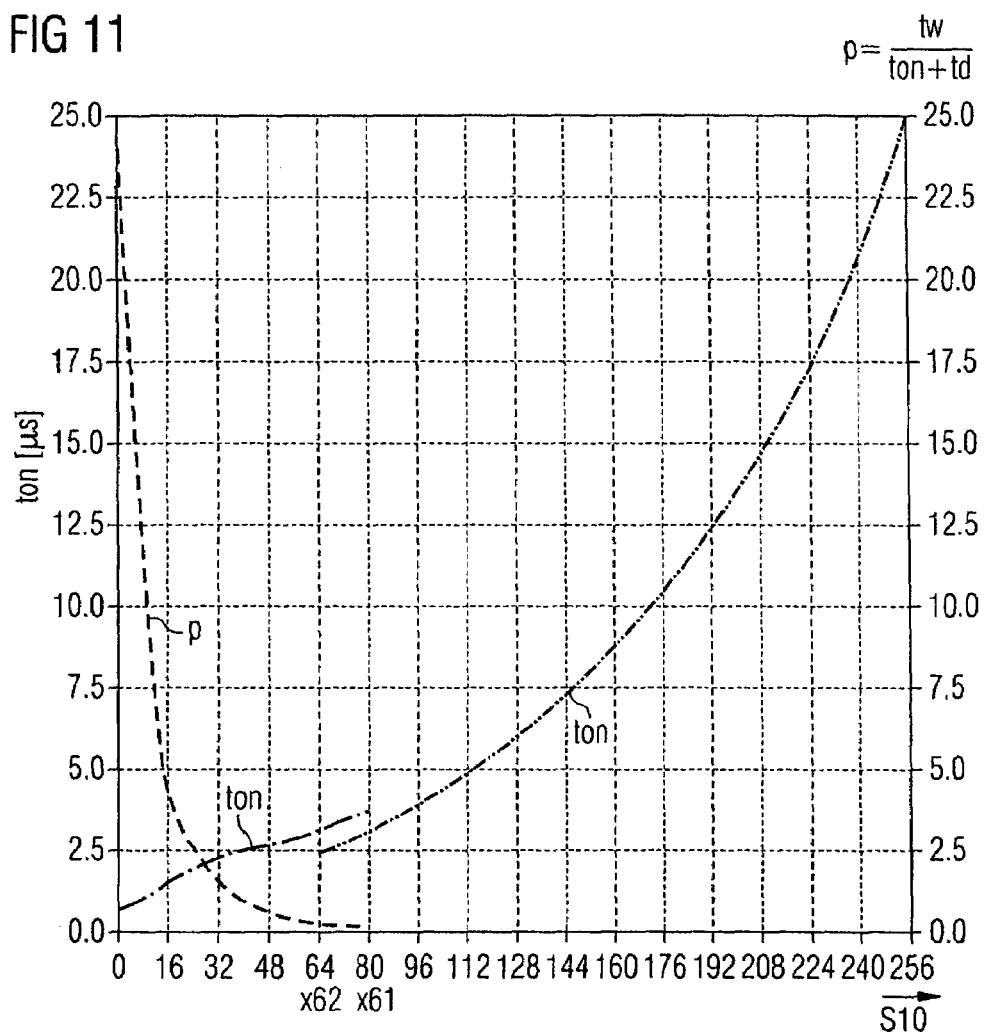
FIG. 11 shows the profile of the switch-on duration and the proportionality factor as a function of the control signal.

FIG. 11 shows the profile of the switch-on duration ton and of the proportionality factor p as a function of the control signal S10. In CCM operation, for which p=0 holds true, the switch-on duration ton rises approximately exponentially as the control signal increases. In WCM operation, for which p>0 holds true, the proportionality factor p rises continuously as the control signal S10 decreases. The switch-on duration ton decreases during WCM operation as the control signal S10 decreases, and thus as the power consumption decreases, although to a significantly lesser extent than would be the case without waiting durations, which, in the manner explained above, necessitate a lengthening of the switch-on duration in order to keep the power consumption constant for a given control signal value.

Figure 10:
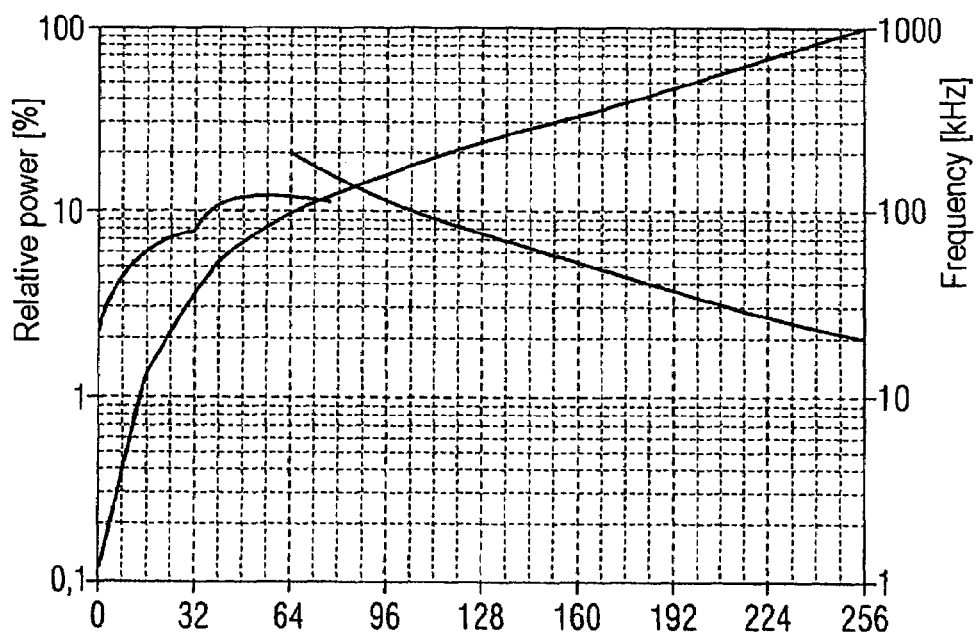
FIG. 10 shows the profile of the power consumption of a switching converter with a drive circuit according to FIG. 6 as a function of the control signal.

FIG. 10 shows, in a joint diagram, the relative power consumption in percent relative to the maximum power consumption as a function of the control signal S10 and also by way of example a profile of the switching frequency of the switch SW as a function of the control signal.

The illustration is simply logarithmic; an exponential rise in the power curve produces a straight line in this illustration. The section by section profile of the functions DV1 and DV2 and the threshold values V3 and V4 in WCM operation are chosen such that the power curves for CCM operation and for WCM operation lie on one another with sufficient accuracy. This avoids jumps in the control signal after a change of the operating mode, that is to say after a change between operation with a waiting time and operation without a waiting time, or vice versa.

In CCM operation, the power consumption is exponentially dependent on the control signal S10 and rises exponentially as the control signal increases.

In WCM operation, that is to say toward low powers or toward low control signal values, the power curve leaves the exponential profile in order also to enable very low powers to be output.

In the WCM range, the switching frequency is approximately constant over a wide range of the control signal. Over more than half of the control signal range extending from 0 to 80 in the example, namely for values between 32 and 80, the switching frequency fluctuates only between 80 kHz and 120 kHz. The switching frequency decreases greatly for smaller control signal values. In this range, the switch-on duration is downwardly limited to a minimum value, as a result of which the waiting durations rise greatly, which is detrimental to the switching frequency.

A drive circuit that supplies a drive signal with the parameters elucidated in FIG. 11, that is to say a drive signal whose switch-on duration rises at least approximately exponentially during CCM operation and in which the proportionality factor p between waiting duration and switch-on duration plus demagnetization duration increases continuously as the control signal decreases, can also be realized with digital means referring to the explanation concerning FIG. 5. For this purpose, the assignment between control signal S10 and switch-on duration ton and between control signal S10 and proportionality factor is stored in a suitable table that is read depending on the respective control signal value S10 for generation of the drive signal with or without a waiting duration.

In an advantageous manner, in WCM operation, the switch-on duration decreases linearly as the control signal decreases, but does not fall below a minimum switch-on duration. Setting the proportionality factor in such a way that an at least approximately constant switching frequency is present results in a quadratic dependence of the power consumption on the control signal. In this case, the proportionality factor is chosen to be inversely proportional to the switch-on duration. Only toward very low power consumptions does the proportionality factor rise to a greater extent than inversely proportionally to the control signal, in order not to fall below a minimum switch-on duration, the quadratic dependence of the power consumption on the control signal then being left.

The dependence of the switch-on duration ton on the control signal S10 advantageously satisfies the following relationship in waiting time operation:

$$ton = a + b \cdot S10,$$

where a defines the minimum switch-on duration $ton_{min}$ and b is a predetermined constant that defines the alteration of the switch-on duration depending on changes in the control signal S10.

LIST OF REFERENCE SYMBOLS

AK1, AK2 Output terminals2
C Capacitor
C1 Capacitor
CCM First state signal, CCM operation signal
D Diode
DAC1, DAC2 Digital-to-analog converters
DV1 First digital control signal
DV2 Second digital control signal
EK1, EK2 Input terminals
FF1, FF2, FF3 Flip-flops
G1 NOR gate
G2 AND gate
G3 OR gate
GL Bridge rectifier
GND Reference-ground potential
I1 Charging current
I12 Charging current
I2 Discharging current
I22 Discharging current
Iin Input current
INV Inverter
Iq1, Iq2 Current source arrangements
Iq11, Iq21 First current sources
Iq12, Iq22 Second current sources K3, K4 Comparators
KS3, KS4 Comparator output signals
L1 Storage inductor
L2 Auxiliary winding
OPV1, OPV2 Amplifiers
R1, R2 Resistors
S10 Control signal
S20 Drive signal
S21 Auxiliary winding signal, first storage state signal
S22 Second storage state signal
SW Switch
SW1 Switch
SW2 Switch
T Period duration
td Demagnetization duration
toff Switch-off duration
ton Switch-on duration
tw Waiting duration
Uin Input voltage
Un Power supply voltage
Uout Output voltage
V+ Supply potential
V1 First analog control signal
V2 Second analog control signal
V3, V4 Reference potentials
WCM Second state signal, WCM operation signal
Z1 Zener diode
10 Controller
13 Control amplifier
14 Reference voltage source
20 Drive circuit
21 Look-up table
22 Pulse width generator
11, 12 Resistors
23 State logic unit
24 Waiting time generator
27 Comparator unit
28 Logic circuit
25, 26 Digital function generators

What is claimed is:

1. A method for providing a drive signal for a switch operable to control the current consumption of an inductive energy storage element in a power factor correction circuit, the power factor correction circuit comprising a rectifier arrangement coupled to the inductive energy storage element and output terminals operable to provide an output voltage, and wherein a control signal is operable to control power consumption, the method comprising:
generating a switch-on level of the drive signal for a switch-on duration dependent on the control signal, and generating a switch-off level of the drive signal after the switch-on duration has elapsed;
detecting a predetermined storage state of the inductive energy storage element after the switch-on duration has elapsed; and
waiting until the end of a waiting duration before renewing generation of the switch-on level, wherein the waiting duration is substantially proportional to the time duration between the beginning of the switch-on level and the detection of the predetermined storage state, and wherein the waiting duration is dependent on the control signal.

2. The method of claim 1 wherein the switch-on duration is substantially exponentially dependent on the control signal.

3. The method of claim 1 wherein a proportionality factor between the waiting duration and the time duration between the beginning of the switch-on level and the detection of the predetermined storage state is constant for a predetermined value range of the control signal.

4. The method as claimed in claim 3 wherein a possible value range of the control signal is subdivided into at least two partial value ranges which are in each case assigned different proportionality factors.

5. The method as claimed in claim 3 wherein a hysteresis is taken into account in the event of a change in the proportionality factor in a manner dependent on the control signal.

6. The method of claim 1 wherein a proportionality factor between the waiting duration and the time duration between the beginning of the switch-on level and the detection of the predetermined storage state changes continuously with changes in the control signal within a predetermined value range of the control signal.

7. The method of claim 1 wherein the detected predetermined storage state of the inductive energy storage element is a first complete demagnetization after the switch-on duration has elapsed.

8. The method of claim 1 wherein the waiting duration between the detection of the predetermined storage state and a renewed generation of a switch-on level is commenced only when the control signal has reached a predetermined first threshold that indicates that the power consumption has fallen below a predetermined first value.

9. The method of claim 1 wherein the switch-on duration is fixedly predetermined if the control signal reaches a predetermined second threshold that indicates that the power consumption has fallen below a predetermined second value.

10. The method of claim 1 further comprising the step of evaluating a charge state of a capacitive element in order to provide the drive signal with waiting durations;
wherein the switch-on level of the drive signal is generated and the capacitive storage element is charged with a charging current dependent on the control signal if a voltage across the capacitive storage element reaches a predetermined first reference value;
wherein the switch-off level of the drive signal is generated if the voltage across the capacitive storage element reaches a predetermined second reference value;
wherein the capacitive storage element is discharged with a discharging current dependent on the control signal if the predetermined storage state of the inductive energy storage element is detected; and
wherein generation of the switch-on level of the drive signal is renewed if the voltage across the capacitive storage element has fallen to the first reference value.

11. The method of claim 10 wherein the first and second reference values are fixedly predetermined.

12. The method of claim 10 wherein different dependencies of the charging and discharging currents on the control signal are set for different partial value ranges of the control signal.

13. The method of claim 1 further comprising the step of evaluating a charge state of a capacitive element in order to provide the drive signal with no waiting durations evaluating;
wherein the switch-on level of the drive signal is generated and the capacitive storage element is charged with a charging current dependent on the control signal if the predetermined storage state of the inductive energy storage element is detected; and
wherein the switch-off level of the drive signal is generated and the capacitive storage element is discharged with a discharging current dependent on the control signal if a voltage across the capacitive storage element reaches a reference value dependent on the control signal.

14. A drive circuit for generating a drive signal for a switch controlling the current consumption of an inductive energy storage element in a switching converter, the drive circuit comprising:
   a first input operable to receive a control signal controlling a power consumption;
   a second input operable to receive a first storage state signal indicating a storage state of the inductive energy storage element;
   an output operable to provide the drive signal;
   a capacitive energy storage element;
   a charging circuit connected to the capacitive energy storage element, wherein the charging circuit provides a charging current dependent on the control signal according to a second storage state signal dependent on the first storage state signal;
   a discharging circuit connected to the capacitive energy storage element, wherein the discharging circuit provides a discharging current dependent on the control signal;
   a first comparator arrangement connected to the energy storage element, wherein the first comparator arrangement compares a voltage across the energy storage element with a first reference value;
   a second comparator arrangement connected to the energy storage element, wherein the second comparator arrangement compares the voltage across the energy storage element with a second reference value; and
   a signal generating circuit operable to generate a switch-on level of the drive signal depending on an output signal of the first comparator arrangement and operable to generate a switch-off level of the drive signal depending on an output signal of the second comparator arrangement.

15. The drive circuit of claim 14 further comprising:
   a state signal generating circuit operable to generate at least one operating state signal depending on the control signal;
   a changeover device operable to feed a constant signal or a signal dependent on the control signal as second reference signal to the second comparator arrangement depending on the at least one operating state signal;
   a second discharging circuit operable to receive the at least one operating state signal and the second storage state signal, wherein the second discharging circuit is coupled to the capacitive energy storage element in order to discharge the energy storage element in the event of a predetermined value of the at least one state signal; and
   a combination circuit in the signal generating circuit, wherein the combination circuit is operable to receive the output signal of the second comparator arrangement, the second storage state signal and the at least one operating state signal, the combination circuit further operable to generate the switch-on level in the event of a first predetermined value of the at least one operating state signal, and the combination circuit further operable to generate the switch-on level in the event of a second predetermined value of the at least one operating state signal.

16. A method for providing a drive signal for a switch operable to control the current consumption of an inductive energy storage element in a power factor correction circuit, the power factor correction circuit comprising a rectifier arrangement coupled to the inductive energy storage element and output terminals operable to provide an output voltage, and wherein a control signal is operable to control power consumption, the method comprising:
   generating a switch-on level of the drive signal for a switch-on duration dependent on the control signal, and generating a switch-off level of the drive signal after the switch-on duration has elapsed;
   detecting a predetermined storage state of the inductive energy storage element after the switch-on duration has elapsed;
   renewed generation the switch-on level of the drive signal upon detection of the predetermined storage state if the control signal indicates a power consumption above a predetermined first threshold; and
   waiting until the end of a waiting duration following the detection of the predetermined storage state before the renewed generation of the switch-on level if the control signal indicates a power consumption below the predetermined first threshold, wherein the waiting duration is substantially proportional to the time duration between the beginning of the switch-on level and the detection of the predetermined storage state and is dependent on the control signal.

17. The method of claim 16 further comprising the step of accounting for a hysteresis in the event of a transition between a generation of a switch-on level without a waiting duration and a generation of a switch-on level with a waiting duration.

18. The method of 16 wherein, in the event of a transition between a generation of a switch-on level without a waiting duration and a generation of a switch-on level with a waiting duration, the switch-on duration is adapted such that a characteristic curve of the power consumption has a continuous profile depending on the control signal.

19. The method of claim 16 wherein the switch-on duration is substantially exponentially dependent on the control signal.

20. The method of claim 16 wherein the switch-on duration decreases linearly with a decreasing control signal.

21. The method of claim 20 wherein the switch-on duration does not fall below a predetermined minimum switch-on duration.

* * * * *